US006552647B1

United States Patent
Thiessen et al.

(10) Patent No.: US 6,552,647 B1
(45) Date of Patent: Apr. 22, 2003

(54) BUILDING ENVIRONMENT MONITOR AND CONTROL SYSTEM

(76) Inventors: Ricky H. Thiessen, 17 Jones Rd., Warwick, NY (US) 10990; Thomas J. Fay, 4 Golf La., Succasunna, NJ (US) 07876; Richard L. DeMarinis, 40 Winding Way, Parsippany, NJ (US) 07054

(*) Notice: Subject to any disclaimer, the term of this patent is extended or adjusted under 35 U.S.C. 154(b) by 0 days.

(21) Appl. No.: 09/345,337

(22) Filed: Jul. 1, 1999

(51) Int. Cl.[7] .............................................. G05B 23/02
(52) U.S. Cl. ...................... 340/3.1; 340/3.9; 340/3.43; 340/3.44; 340/604; 340/605; 122/448.1; 219/448.11; 219/448.12; 431/22
(58) Field of Search .................... 340/3.1, 3.9, 3.43, 340/3.44, 604, 605, 825.69, 825.72; 219/481, 414, 448.12, 448.11, 506; 122/448.1, 504; 431/22

(56) References Cited

U.S. PATENT DOCUMENTS

| 1,609,930 A | 12/1926 | Cohen |
| 1,912,798 A | 6/1933 | Sickels |
| 2,532,214 A | 11/1950 | Willenbora |
| 3,236,284 A | 2/1966 | Kemper |
| 4,219,806 A | 8/1980 | Enemark |
| 4,338,526 A | 7/1982 | Martin |
| 4,380,243 A | 4/1983 | Braley |
| 4,418,712 A | 12/1983 | Braley |
| 4,464,651 A | 8/1984 | Duhame |
| 4,581,606 A | 4/1986 | Mallory |
| 4,995,415 A | 2/1991 | Weber |
| 5,189,392 A | 2/1993 | Kass |
| 5,280,802 A | 1/1994 | Comuzie, Jr. |
| 5,489,889 A | 2/1996 | Kambouris et al. |
| 5,576,739 A | 11/1996 | Murphy |
| 5,797,358 A | * 8/1998 | Brandt et al. ............ 122/448.1 |
| 6,130,412 A | * 10/2000 | Sizemore .................... 219/481 |
| 6,157,307 A | * 12/2000 | Hardin ........................ 340/604 |

OTHER PUBLICATIONS

U.S. Product Safety Commission, Release 98–072, Manufacturers announce recall program to replace vent pipes on home heating systems (Feb. 24, 1998).

* cited by examiner

Primary Examiner—Michael Horabik
Assistant Examiner—Yves Dalencourt
(74) Attorney, Agent, or Firm—Law Office of Leo Zucker (57) ABSTRACT

A monitor and control system that responds to alarm signals representing different hazardous conditions in an environment having a number of utility service supply lines, such as a home residence. One or more sensors coupled to the processor are each associated with one or more of the service supply lines. Each sensor produces an alarm signal in response to a hazardous condition attributable to an associated supply line. Each associated supply line is provided with a control device that is coupled to an output of the processor, and the processor is configured to produce one or more output signals in response to an alarm signal at a given input. Each control device is arranged to disable its associated supply line with respect to a sensed hazardous condition in response to a corresponding output signal from the processor.

20 Claims, 7 Drawing Sheets

| INPUTS | OUTPUTS |
|---|---|
| WATER SENSOR 1 (OTHER) | VISUAL DISPLAY |
| WATER SENSOR 2 (BOILER) | SYSTEM STATUS INDICATOR |
| WATER SENSOR 3 (WATER HEATER) | SIREN |
| CARBON MONOXIDE | EXTERNAL SIREN |
| SMOKE DETECTOR | PHONE DIALER |
| TEMPERATURE | WATER VALVE 1 |
| WATER PUMP | WATER VALVE 2 |
| WATER ALARM OVERRIDE | WATER VALVE 3 |
| | BOILER RELAY 1 |
| | BOILER RELAY 2 |
| | WATER HEATING SUPPLY SWITCH |
| | AUX. RELAY |

| | VISUAL DISPLAY | SYSTEM STATUS INDICATOR | SIREN (PRIMARY ALARM) | EXTERNAL SIREN | PHONE DIALER | WATER VALVE 1 | WATER VALVE 2 | WATER VALVE 3 | BOILER RELAY 1 | BOILER RELAY 2 | HEATING SUPPLY SWITCH (WATER) | AUX. RELAY |
|---|---|---|---|---|---|---|---|---|---|---|---|---|
| WATER SENSOR 1 | A | A | A | O | O | $C_1$ | | | | | | A |
| WATER SENSOR 2 | A | A | A | O | O | | $C_2$ | | A | A | | |
| WATER SENSOR 3 | A | A | A | O | O | | | $C_3$ | | | $C_T$ | |
| CARBON MONOXIDE | A | A | A | O | O | | | | A | A | $C_T$ | |
| SMOKE | A | A | A | O | O | | | | A | A | $C_T$ | |
| TEMPERATURE | A | A | A | O | O | | | | | | | |
| WATER PUMP | A | A | A | O | O | | | | | | | |
| WATER ALARM OVERRIDE | | | | | | $C_1$ | $C_2$ | $C_3$ | | | | |

[A] ALWAYS BOUND
[C] CONDITIONALLY BOUND
[O] OPTIONALLY BOUND

| | |
|---|---|
| $C_1$ | WATER SENSOR 1 WILL BE BOUND TO WATER VALVE 1 ONLY WHEN THE WATER ALARM OVERRIDE INPUT IS INACTIVE. |
| $C_2$ | WATER SENSOR 2 WILL BE BOUND TO WATER VALVE 2 ONLY WHEN THE WATER ALARM OVERRIDE INPUT IS INACTIVE. |
| $C_3$ | WATER SENSOR 3 WILL BE BOUND TO WATER VALVE 3 ONLY WHEN THE WATER ALARM OVERRIDE INPUT IS INACTIVE. |
| $C_T$ | WATER SENSOR 3, CARBON MONOXIDE, AND SMOKE WILL BE BOUND TO HEATING SUPPLY SWITCH ONLY WHEN THE WATER HEATER TYPE HAS BEEN CONFIGURED TO BE OF TYPE "OTHER" VIA THE CONFIGURATION MENU |

BUILDING ENVIRONMENT MONITOR AND CONTROL SYSTEM

BACKGROUND OF THE INVENTION

1. Field of the Invention

This invention relates generally to monitoring systems, and particularly to a system for sensing, alarming and correcting hazardous conditions arising from a variety of causes in a building environment including home residences.

2. Discussion of the Known Art

Recently, manufacturers of high-temperature plastics vent (HTPV) pipes joined with the United States Consumer Products Safety Commission (CPSC) to announce a recall program. Under the program, an estimated 250,000 HTPV pipe systems associated with gas or propane furnaces in consumers' homes are being replaced free of charge. This is because HTPV pipes have been found to develop cracks and thus leak potentially fatal carbon monoxide (CO) gas. CO is a colorless, odorless gas produced by incomplete burning of carbon-based fuel, including natural gas and propane. The CPSC recommends that every home should be equipped with at least one CO sensor meeting all applicable standards. See CPSC Release #98-072 (Feb. 24, 1998).

Arrangements are known wherein a supply of a fuel such as natural or propane gas to an appliance (e.g., a water heater), is shut off by a valve upon detection of unburned gas above a certain threshold. See, for example, U.S. Pat. No. 1,609,930 (Dec. 7, 1926); U.S. Pat. No. 1,912,798 (Jun. 6, 1933); U.S. Pat. No. 2,532,214 (Nov. 28, 1950); and U.S. Pat. No. 3,236,284 (Feb. 22, 1966). The '284 patent also discloses an alarm that is actuated upon a malfunction. See also U.S. Pat. No. 4,219,806 (Aug. 26, 1980).

U.S. Pat. No. 5,189,392 (Feb. 23, 1993) shows a heating system shut-off arrangement, which system uses an existing safety switch or fuel valve of a combustion unit. The combustion unit is shut down in response to an output from an environmental condition sensor which senses smoke, heat, gas, flame and/or rate of heat rise. U.S. Pat. No. 5,280,802 (Jan. 25, 1994) also shows gas appliance detection apparatus for use with a water heater. The apparatus uses two sensors to detect gas spillage on account of a flue restriction, or a gas fume backup at the flame portion of the heater.

U.S. Pat. No. 4,338,526 (Jul. 6, 1982) and U.S. Pat. No. 4,464,651 (Aug. 7, 1984) show a home security/garage door operating system wherein a garage door is opened in response to detection of carbon monoxide above a preset level. Further, U.S. Pat. No. 5,576,739 (Nov. 19, 1996) discloses a carbon monoxide safety system capable of decreasing the concentration of CO by opening a garage door, or by interrupting power to a furnace.

A central monitor for a home security system is shown in U.S. Pat. No. 4,581,606 (Apr. 8, 1986). While the system includes a number of sensors relating to heat, intrusion and appliance operation, there is no provision of any mechanism for corrective action such as, e.g., interrupting a water or fuel supply to a malfunctioning appliance.

Notwithstanding the above disclosed arrangements, there remains a need for a system that (a) allows a property owner to monitor a number of different utilities and appliances for dangerous conditions such as, e.g., the presence of CO, unusual levels of water, or excessively high or low temperatures at selected locations, (b) alarms the condition and provides relevant information to the owner or other responsible persons, e.g., via a telephone link, and (c) initiates certain corrective measures specific to the alarmed condition or conditions.

SUMMARY OF THE INVENTION

According to the invention, a monitor and control system includes a processor for responding to alarm signals representing different hazardous conditions in an environment having a number of utility service supply lines. One or more environmental condition sensors are coupled to corresponding inputs of the processor, and each sensor is operatively associated with one or more of the service supply lines. Each sensor produces an alarm signal in response to a hazardous condition attributable to an associated service supply line, and each supply line is provided with a control device that is coupled to a corresponding output of the processor. The processor is configured to produce one or more output signals as desired in response to an alarm signal at a given input of the processor, and each control device is constructed and arranged to disable its associated supply line with respect to a sensed hazardous condition in response to a corresponding output signal from the processor.

For a better understanding of the invention, reference is made to the following description taken in conjunction with the accompanying drawing and the appended claims.

DETAILED DESCRIPTION OF THE INVENTION

Figure 1:
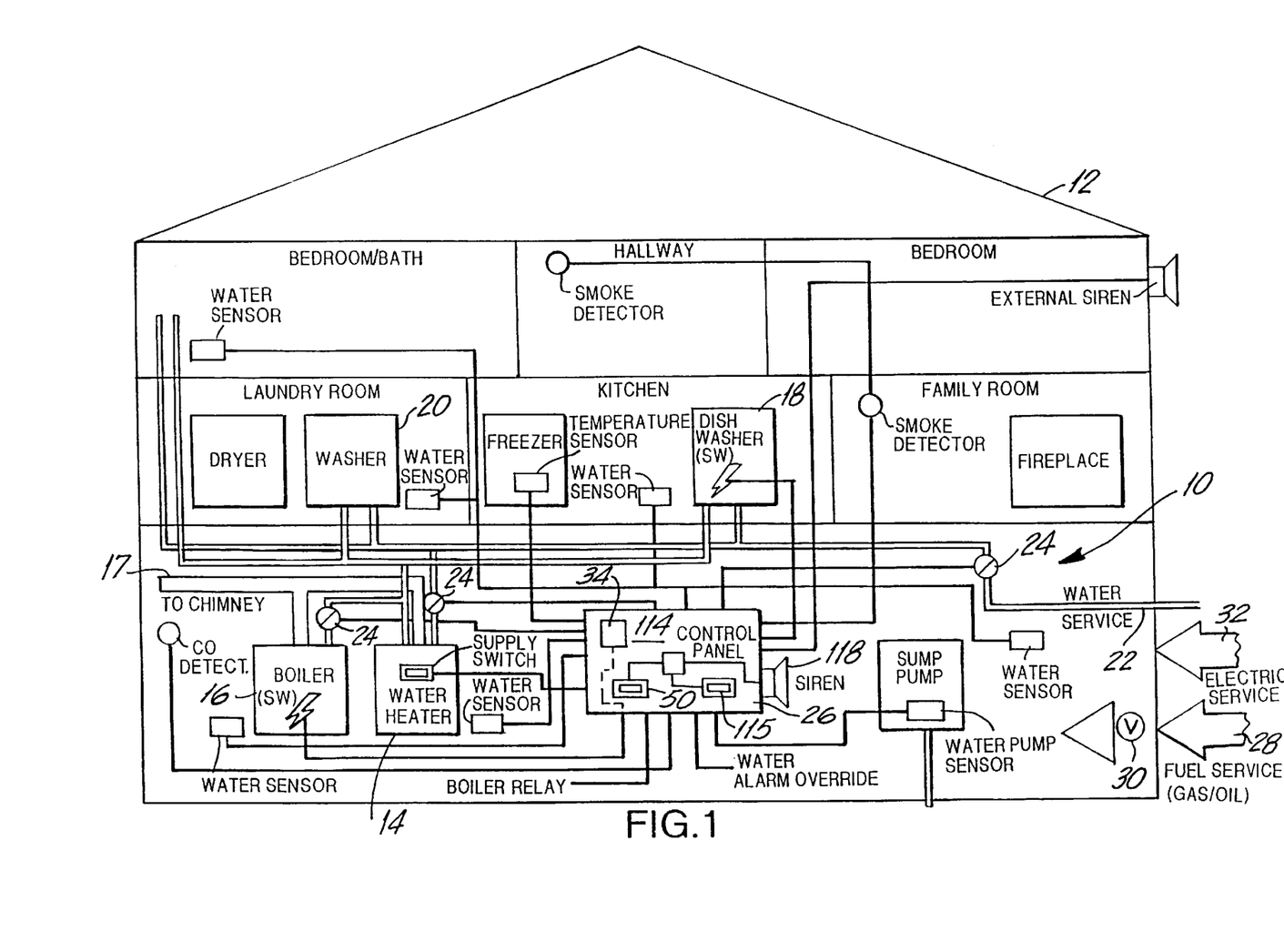
FIG. 1 is a block diagram of a building environment monitor and control system according to the invention.

FIG. 1 is a block diagram showing a monitor and control system 10, according to the invention. The system 10 is constructed and arranged to avoid or reduce potentially harmful consequences of malfunctioning utilities or appliances located in a home 12, or in other inhabited environments such as offices, workshops, retail stores and the like. Such malfunctions may range from a small leak in a water heater 14 or loss of building heat due to failure of a boiler 16, to extremely hazardous conditions such as a build up of carbon monoxide (CO) gas from a blockage in a flue 17 of a furnace chimney. As explained below, the system 10 operates by taking the following steps upon sensing a malfunction.

One or more utility service supply lines are disconnected or disabled to alleviate a sensed hazardous condition. For example, if a leaking dishwasher 18 or washing machine 20 is fed by a water service supply line 22, the supply line 22 is valved off either at a main inlet or at the appliance itself, by a water valve 24. The valve 24 is driven by a control signal from a processor in a main control unit 26.

If a gas or oil-fired appliance such as the water heater 14 or the boiler 16 generates excessive CO, a fuel service supply line 28 is closed either at a main inlet or at the appliance by, e.g., a control valve 30 which is also driven by the control unit 26. And, if the malfunctioning fuel-consuming appliance is also powered by an electric service supply line 32, the supply line 32 is disconnected, for example, by a switch 34 which may be provided within the control unit 26.

System 10 also operates to inform designated, responsible persons such as a property owner or building manager of the nature of each sensed event, and of any corrective action taken by the system. For example, a voice or text message such as, "Hot water heater leaking water—water and gas to water heater turned off—Friday, 10:45 A.M.", is sent to the person as described below. In this respect, the system 10 obviates the need for third-party monitoring stations or alarm companies, and a set of telephone numbers can be programmed into the system 10 to alert specific persons in a designated order.

The system 10 may be configured to avert water damage from broken water pipes or heaters, boilers, holding tanks, washing machine hoses, and sump pump failures. These conditions typically arise from pipes freezing due to a general heating failure, defective controls on appliances, or appliance failure and leakage. For example, the system may operate to shut off a main water supply line inlet if temperature probes at a number of locations sense a general heat outage condition.

The main control unit 26 is connected to a power source such as, for example, a rechargeable battery 40. A number of sensors may be installed throughout the home to detect and to signal abnormal conditions, appliance malfunctions, or both. Such sensors include, but are not limited to, sensors of water, temperature, smoke, and CO. The controlled devices include, for example, water and fuel valves; switches, relays or circuit breakers for interrupting the supply of electric power to associated appliances; and audible and visual alarms. A clock, and user-operated buttons and switches are provided on the unit 26. Typical sensors and devices are identified below.

A voice/data unit 50 is provided to allow text or voice messages to be communicated to selected persons who may carry a pager or a cellular phone, or who work or live near the building monitored by the system 10. The system thus provides its owner with peace of mind and, importantly, may allow for substantial savings in premiums for property insurance coverage.

A modular architecture for the system 10 allows the user to acquire or select only those features needed for a particular application, and to expand the capabilities of the system over time. Thus, budget conscious users may benefit from the protection and convenience offered by a "basic" version of the system 10, knowing that their initial investment is protected if they decide to expand the system later.

Figure 2:
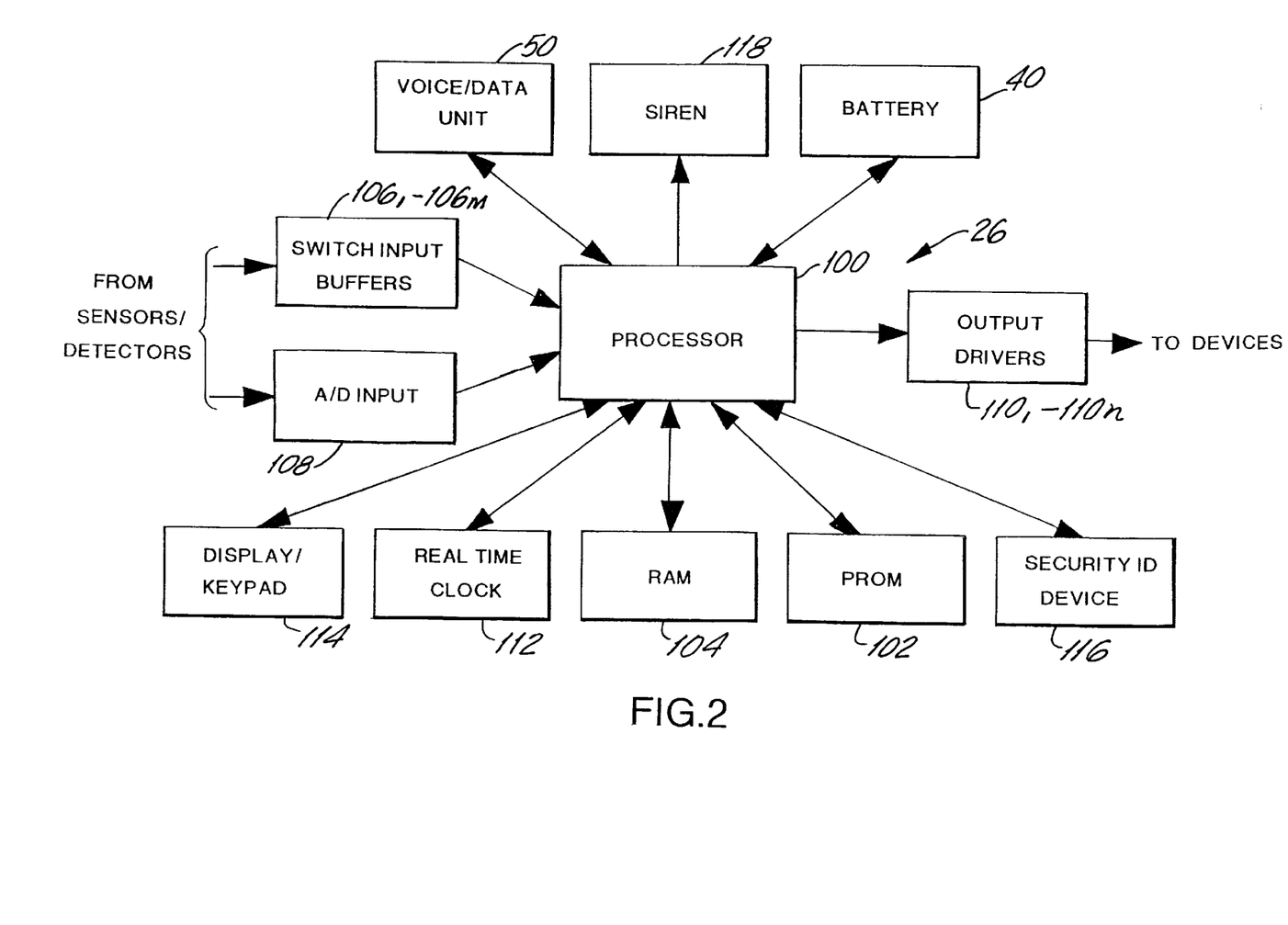
FIG. 2 is a schematic block diagram of a main control unit of the system in FIG. 1.

FIG. 2 is a schematic block diagram of the monitor and control system 10. The system 10 includes a commercially available processor 100 such as, for example, type 8751 XA-G3 available from Philips Semiconductor. The processor 100 is associated with or coupled in a known manner to a conventional non-volatile, programmable memory device such as an $E^2$ or a flash PROM 102. Processor 100 is also associated with a conventional random access memory (RAM) 104 for storing ongoing program and operating data.

System sensors having either an ON or an OFF (e.g., "1" or "0") output are coupled to one or more corresponding switch input buffers $106_1$ to $106_m$. Outputs of the buffers $106_1$–$106_m$ are coupled to input terminals of the processor 100. Analog sensor devices whose outputs vary over a certain range, e.g., certain temperature sensors, are coupled to one or more corresponding A/D input buffers 108, and digital signals output from the buffers 108 are coupled to other input terminals of the processor 100. A series of output drivers $110_1$ to $110_n$ are coupled to output terminals of the processor 100. The drivers activate associated devices (e.g., relays, outside valves, and the like) in response to corresponding output signals from the processor 100.

The system 10 may incorporate a clock 112 which provides an ongoing, real-time and date function for purposes of recording each hazardous condition or event sensed by the system 10. The battery 40 maintains the processor 100 and the clock 112 operational for a determined amount of time during a power outage. Battery 40 may also hold all device driver outputs in a present state, whether open or closed. During normal operation, the battery 40 may be continuously "trickle" charged by a conventional recharge circuit connected to the AC mains at the monitored premises.

A display/keypad panel 114 on the main control unit 26, operates as a primary user interface with the system 10 through the processor 100. Processor 100 is programmed and configured in a known manner to output alpha-numeric text data and user prompts to the panel 114, and to receive and to process input commands entered by the user from the panel. A security ID device 116 may be incorporated, if desired, to prevent unauthorized duplication of the system. One such device is available from Dallas Semiconductor as Uniqueware (TM) Model D52502-UNW. A siren 118 or other loud audible alert device is also driven by the processor 100 to provide an audible alert of a sensed hazardous condition.

Figure 3:
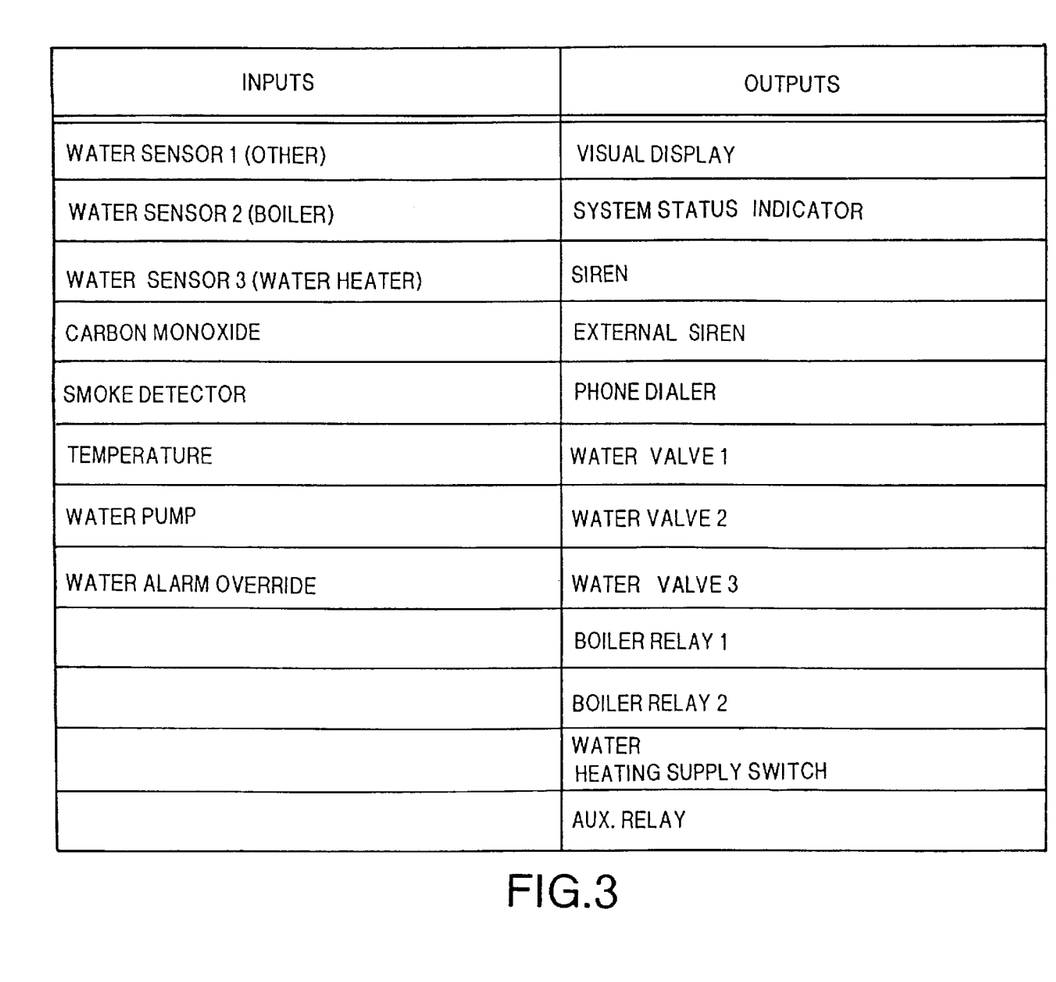
FIG. 3 is a Table showing an example of sensor input and device output configurations for the system.

FIG. 3 is a Table, showing an example of a typical sensor input and device output configuration for the system 10. The configuration of FIG. 3 employs three dedicated water sensors (1–3) associated with a boiler, a water heater, and "other". The "other" can be any other appliance such as a washing machine or a dishwasher that is fed by the water supply line 22. The configuration thus contemplates that the supply line 22 may be shut at three different places, i.e., at the water inlets of the boiler, the water heater, and another selected appliance as well as the building water supply main inlet.

The Table of FIG. 3 also shows one carbon monoxide sensor and one smoke detector. More than one CO sensor and more than one smoke detector may be wired in corresponding parallel sets, and each set connected to the corresponding system inputs to provide sufficient coverage, however.

One temperature input is provided in the configuration of FIG. 3 to receive data from a temperature sensor indicative of frozen pipes, freezer or refrigerator failures, air conditioning or heating failures, or other selected temperature-related application. A water pump input in the FIG. 3 configuration receives signals indicative of, for example, a sump pump failure.

A water alarm Override input is provided to receive signals indicating that an external device such as a water sprinkler system has been triggered. This feature ensures that the system 10 will not operate to close any water valve that feeds the sprinkler system, if one of the water sensor inputs simultaneously signals a water-related condition.

That is, if the sprinkler system was triggered to extinguish a fire, it may be desirable to keep some or all of the water valves in an "open" state, to aid in extinguishing the fire.

A phone dialer output in the FIG. 3 configuration refers to the voice/data unit 50 in FIG. 2. As mentioned, the unit 50 includes a telephone dialing and alarm message feature for the system 10, and the unit may be provided as an optional feature to lower the initial cost of the system. For example, the voice/data unit 50 may be in the form of a "plug in" printed circuit board that can be added to the main control unit 26 at a later date. The configuration of FIG. 3 is but one example of a number of different working configurations for the system 10, and additional inputs and outputs may be added through corresponding input buffer and output driver stages in the arrangement of FIG. 2.

Figure 4:
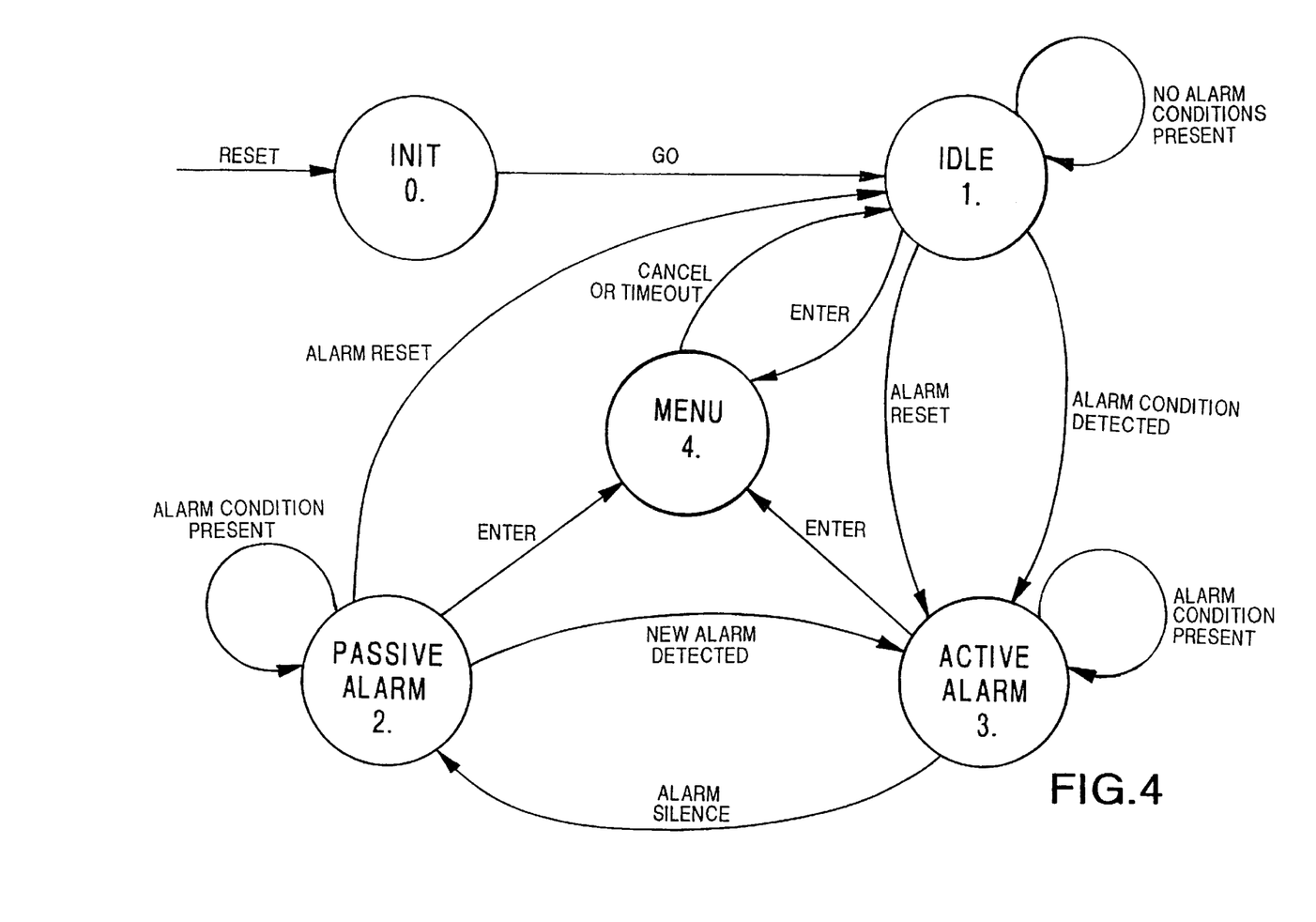
FIG. 4 is a diagram showing an example of software architecture for the system.

FIG. 4 is a diagram showing an example of an operating architecture for the system 10. The diagram is for purposes of illustration and is not intended to limit the system 10 to a particular software architecture or hardware configuration.

In FIG. 4, the system 10 operates in one of four main states after undergoing an initialization routine (INIT) when first powered-up, or when reset manually via the system software.

Initialization (INIT)

The system 10 enters the INIT state upon a manual power-up or reset, or a "soft" reset command that may be produced within the system software under defined conditions. During the INIT state, the system 10 typically performs a self-test, validates its configuration, and resets certain data as may be required. The system then transitions to an idle (IDLE) state.

Idle State (IDLE)

When in the IDLE state, the system 10 continuously monitors the status of all input signals associated with the sensors or detectors coupled to the input buffer stages 106, 108, in FIG. 2. A system status indicator 120 (see FIG. 6) is typically illuminated green, and a display part 115 of the panel 114 shows the time, date, and ambient temperature. The external siren 118 is set to an off state, and each one of the output drivers $110_1$–$110_n$ in FIG. 2 is also set to an off or default state.

The system 10 remains in the IDLE state until an alarm signal is received through one of the system input buffers 106, 108. Upon detection of an alarm signal, the system 10 transitions to an ACTIVE ALARM state.

Active Alarm State (ACTIVE ALARM)

In the ACTIVE ALARM state in FIG. 4, the system status indicator 120 (FIG. 6) illuminates red, and the display part 115 is driven by the processor 100 to indicate the sensor(s) signaling the alarm condition. Processor 100 then outputs a control signal to drive the siren 118, and any other external audible alarm devices that may be provided. If the voice/data unit 50 is installed, the processor 100 activates the unit 50, and each of a number of pre-programmed telephone numbers are called in a determined sequence. A person answering each call is then given details of the alarm condition. If a pager or other messaging service is called, a corresponding text message may be transmitted by operation of the unit 50.

For each alarm signal received from a system sensor or detector, the processor 100 signals only certain desired output drivers $110_1$–$110_n$ whose identities can be programmed or otherwise associated with the sensor that produces the alarm signal. For example, if a water sensor associated with a washing machine signals a flood condition, a water valve located on the main supply line may be driven to a closed state with no further corrective action.

If a carbon monoxide detector signals a CO level above a certain threshold next to a gas-fired house heater, processor 100 can be configured to drive a relay switch associated with the heater to open the electric supply line at the heater, thus disabling the gas valve of the heater and causing the offending heater flame to extinguish. Also, if a water sensor associated with a gas-fired water heater produces an alarm signal, then the processor 100 may be programmed both to open a relay to disconnect the electric supply line, and to close a water feed valve at the water heater.

The system 10 will typically remain in the ACTIVE ALARM state until the user depresses a "Reset" button 142 on the display/keypad panel 114 (see FIG. 6), and the system 10 returns to the IDLE state. If, however, the user operates a silence button 122 on the panel 114, the system 10 transitions to a PASSIVE ALARM state in FIG. 4.

Passive Alarm State (PASSIVE ALARM)

In the PASSIVE ALARM state, the status indicator 120 on the panel 114 illuminates yellow. The display 115 continues to show the sensor(s) that are signaling a hazardous condition. The siren 118, and any other external audible alarms that may be provided are turned off, however. The modem unit 50 is also disabled.

As the user remedies the hazardous condition or malfunctioning appliance, the panel 114 is updated to show only those sensors or detectors that continue to produce alarm signals. Once no further alarm signal is received at the system input buffers 106, 108, the display 115 reads, e.g., "NO ALARMS PRESENT".

When the user depresses the reset button 142, the system 10 returns to the IDLE state. If the reset button is operated during a PASSIVE ALARM state without clearing all sources of alarm signals, the system 10 returns to the IDLE state, re-detects the alarm condition, and transitions at once to the ACTIVE ALARM state.

Also, if the system processor 100 senses a new alarm signal while the system 10 is in the PASSIVE ALARM state, i.e., an alarm signal that was not present when the system initially transitioned into the PASSIVE ALARM state, the processor 100 may be configured to transition back to an ACTIVE ALARM state, and to inform the user of the new alarm condition that is being detected.

Menu State (MENU)

When in the MENU state in FIG. 4, the status indicator 120 (FIG. 6) may be driven by the processor 100 to flash. The display part 115 is then updated by processor 100 to show a defined Menu Heading to the user or installer. The MENU state may be entered from any of the IDLE, the ACTIVE ALARM, or the PASSIVE ALARM states of the system 10. Once the system enters the MENU state, outputs from the processor 100 to drive the siren 118 and any other external audible alarms, are disabled.

Figure 6:
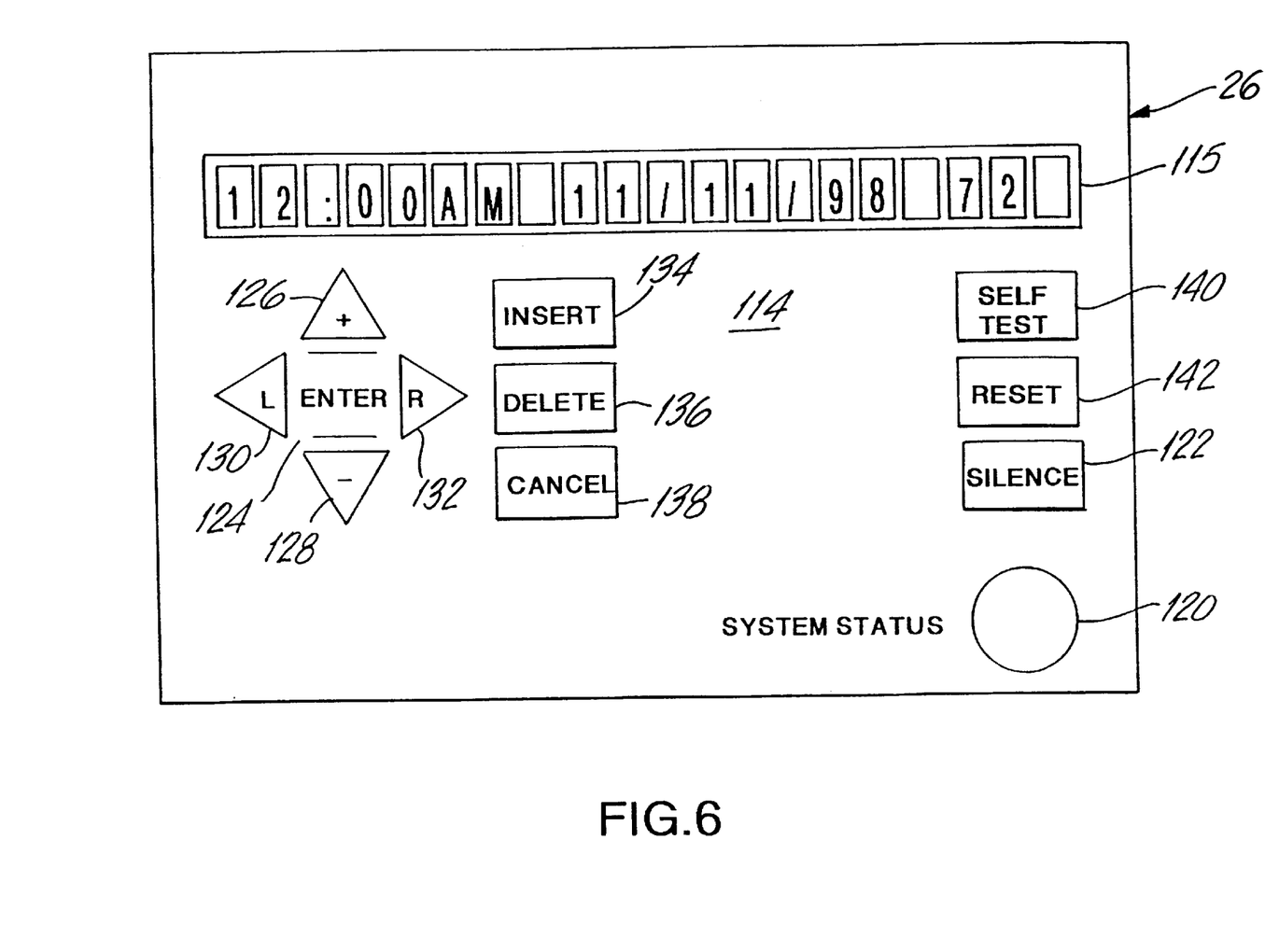
FIG. 6 shows a user panel interface on the main control unit.

In the MENU state, the system user or installer may be given access to an entire menuing system by operation of the processor 100. If an idle timer associated with the MENU state expires, or if a "Cancel" button 138 in FIG. 6 is pressed while a menu heading is displayed, the system 10 returns to the IDLE state. If alarm signals continue to be produced by system sensors or detectors, the processor 100 immediately responds to such signals and transitions the system 10 back to the ACTIVE ALARM state.

Figure 5:
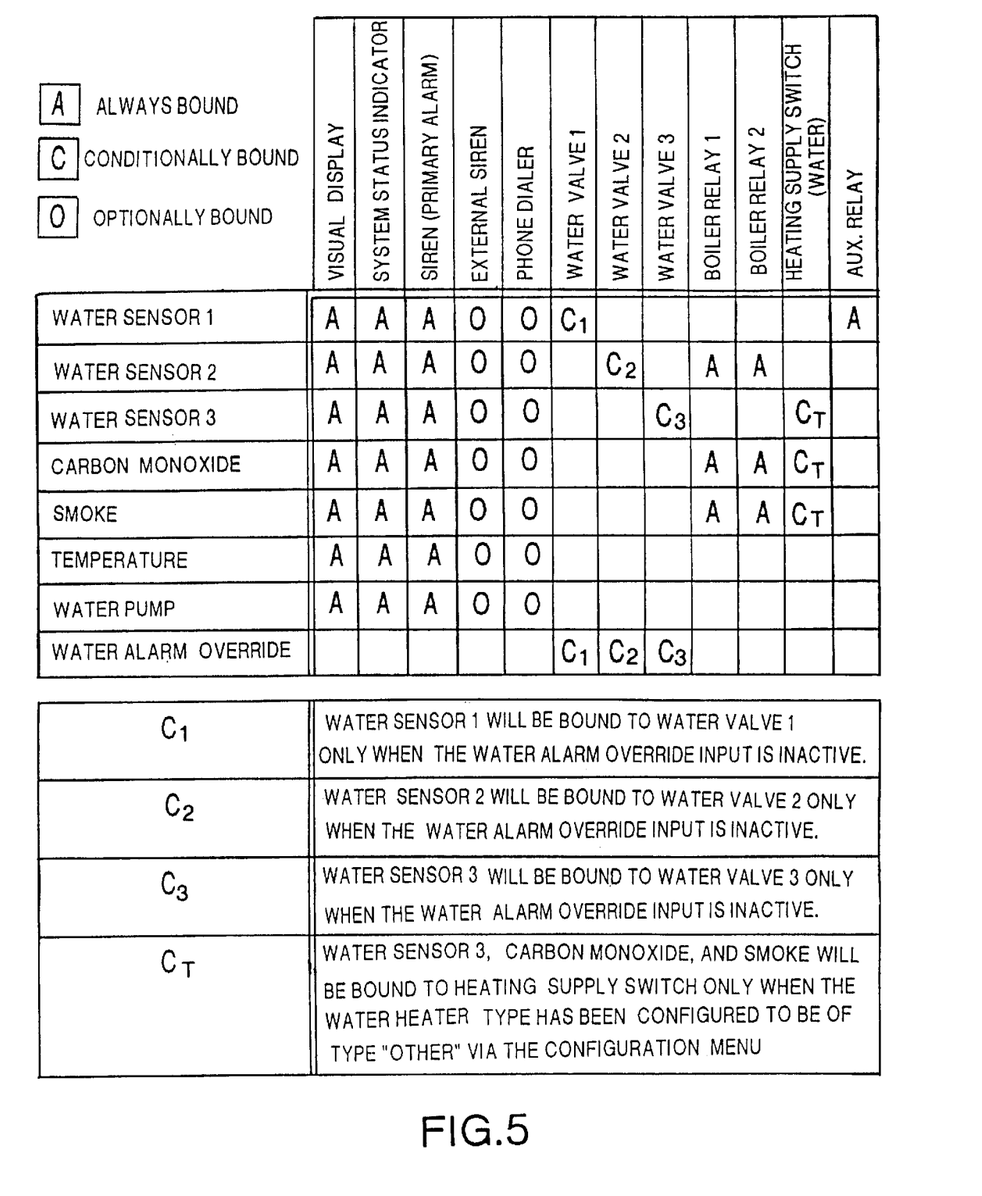
FIG. 5 is a table of connection block bindings for the system.

FIG. 5 is a Table showing so-called connection block bindings for the system 10. To ease installation and system maintenance requirements, desired bindings or relationships can be pre-set between certain specified inputs and outputs of the system 10. That is, certain of the inputs to the buffers $106_1$–$106_m$ and 108; and the outputs from the drivers $110_1$–$110_n$ in FIG. 2; may be identifiably marked and have dedicated purposes. Thus, detection of one or more alarm signals will result in one or more desired control outputs from the system drivers $110_1$–$110_n$. Each specified alarm signal input is therefore tied or "bound" to one or more specified system outputs. If any of the inputs or outputs is "optional" (O), i.e., not active unless certain optional sensors or devices are installed (such as the voice/data unit 50), the system processor 100 may be re-programmed or otherwise set to accommodate the installation of the optional feature within the system 10.

The Table in FIG. 5 is an example of one of a number of different relationships between inputs to an outputs from the main control unit 26, and assumes that the sensors and devices shown in the configuration of FIG. 3 are provided. In FIG. 5, various actions taken by the control unit 26 when one or more of its inputs is active, are defined.

For example, assume an alarm signal is present at the "Water Sensor 1" input. The control unit 26 will always (A) update the display part 115 to indicate a water alarm condition; always (A) change the system status indicator 120 to red; always (A) sound the primary siren or alarm 118; and always (A) drive a switched output which can be provided in the form of a circuit breaker that cuts the electric supply line 32 with respect to the dishwasher 18 or the washing machine 20 in response to an alarm signal from Water Sensor 1. Assuming that the voice/data unit 50 and an external siren or alarm are optional features that may be installed by the user at a later date, the "Phone Dialer" and the "External Siren" outputs are optionally (O) tied to Water Sensor 1, in FIG. 5.

The processor 100 may also conditionally ($C_1$) signal an output driver that controls "Water Valve 1", if a "Water Alarm Override" input in FIG. 5 is absent. The water alarm override input is included to prevent the system 10 from cutting off water to any water-based fire suppression system that could have triggered the water sensor 1 alarm input in the presence of a fire. That is, to avoid damage by an ongoing fire, it is better to allow an operating sprinkler system to continue to effuse water which may also happen to be sensed by the system 10. In the FIG. 5 arrangement, "Water Valve 2" and "Water Valve 3" outputs are also conditionally ($C_2$), ($C_3$), tied to the water alarm override input.

FIG. 6 shows a typical appearance of the main control unit 26 in FIG. 1, including the panel 114. The panel 114 interfaces the user or installer with the system 10, and allows him or her to configure and to operate the system. The display part 115 of the panel provides visual indications of system status. The configuration in FIG. 6 is exemplary only, and is not intended to limit the system 10 from being operated through other suitable user interface arrangements, including but not limited to remote operation of the system by way of, e.g., the voice/data unit 50.

The display part 115 in FIG. 6 is constructed and arranged to display alpha-numeric characters in response to data and control signals from the processor 100, and may be set to operate in one or more languages depending on the location at which system 10 will be installed. The internal audible alarm 118 and a chime may also be incorporated in the unit 26. Typically, the chime could be set to sound three times when the user enters an invalid key sequence, once to indicate acceptance of a desired action to be taken by the system, and five times when the system informs the user of an "alarm history full" condition explained later below.

The system status indicator 120 prompts the processor 100 to inform the user of the overall state of the system 10. The indicator 120 may, for example, illuminate (i) green, when the system is operating normally and no alarm conditions are present, (ii) red, when an alarm condition is present at one or more of the sensor/detector inputs, and (iii) yellow, when the user operates the silence button 122 and one or more alarm signals are present at the system input.

The display/keypad panel 114 also has an Enter button 124 that lets the user invoke a number of different system functions, depending on the state of the system when the button 124 is depressed. For example, the button 124 may allow the user to gain access to a menu system shown in FIG. 7, choose a Menu Heading, and select a Menu Item under the chosen heading. The user may also enter desired insertions, modifications or deletions to a given Menu Item by operating the button 124. If provided, the internal chime may be sounded whenever the button 124 is depressed after making one of the above choices, to indicate the acceptance and integration of the choice by the system processor 100.

The panel 114 may also have Plus (+) and Minus (−) buttons 126, 128, to provide the user with the ability to increment or decrement choices presented by the display part 115 within a specific Menu Item. Further, the panel 114 may include Left and Right buttons 130, 132, to enable the user to select a Menu Heading, or an Item immediately to the left or the right of a currently selected Menu Heading or Item. See FIG. 7. The Left/Right buttons 130, 132, may also allow the user to move a display cursor from a current position on the display part 115, to a position directly to the left or the right when dealing with multi-character data within a given Menu Item.

An Insert button 134 is arranged to prompt the processor 100 to allow the user to insert a character, e.g., to the left of a current cursor position on the display part 115 thus shifting all characters to the right of that position by one space. The button 134 may also be used to edit multi-character data in the system.

Also, a Delete button 136 is provided to signal the processor 100 to allow the user to delete a character at a current cursor position on the display part 115, thus shifting all subsequent characters at the right of that position, to the left by one space. The button 136 may also be used when editing multi-character data in the system 10. Further, a cancel button 138 may allow the user to exit a current Menu Heading, without making any changes prior to committing the system by operating the Enter button 124.

A Self-Test button 140 is arranged to direct the processor 100 to implement a system self test whenever the button is operated. If the button 140 is operated while system 10 is in the IDLE state, the processor 100 operates to sound the siren 118 and any external alarm, and to update the display part 115 to show that an "alarm test" condition exists. Apart from the audible alarms, the system self-test routine has no effect on any other devices driven by the system output drivers $110_1$ to $110_n$. Such devices, along with other system test routines, are accessed by a Test Menu Heading, described below.

A Reset button 142 on the panel 114 operates to signal the processor 100 to reset the system 10, as described above. That is, operation of the button 142 causes the system 10 to transition to the IDLE state. Also, the silence button 122 is arranged to signal the processor 100 to turn off all audible alarms associated with the system, and to disable the voice/data unit 50. This alarm "muting" operation may be carried out while the user is clearing the environment of a sensed hazardous condition. As mentioned, operation of the silence button 122 causes the system 10 to transition to the PASSIVE ALARM state, described above.

Figure 7:
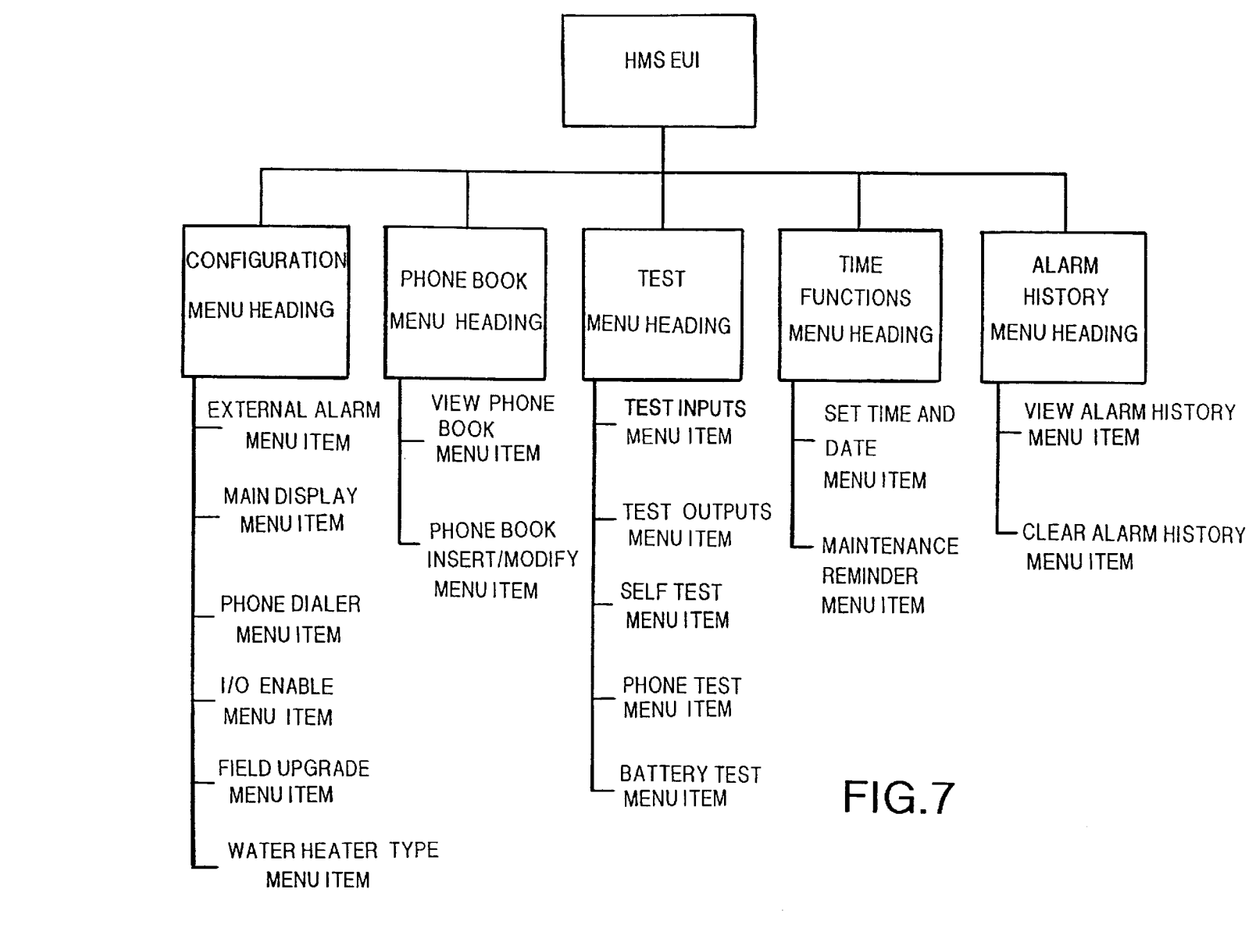
FIG. 7 is a configuration of system menu headings with associated menu items.

The menu operation implemented by the processor 100 and illustrated in FIG. 7, will now be described. The menu flow in FIG. 7 gives the user access to all user-configurable items in the system 10, and allows him or her to retrieve any historical data saved by the system. Access to the menu operation is obtained, for example, by operating the Enter button 124 on the display/keypad panel 114. If, no activity is sensed by the processor 100 after a time lapse of, e.g., five minutes, the menu operation is exited and a default main display is restored, such as shown in FIG. 6. The menu operation may also be exited at any time by operating the Cancel button 138 during display of any system Menu Heading. As mentioned, operating the Cancel button 138 during the display of a Menu Item, returns the display to the corresponding Menu Heading. Operating the Enter button when a word such as, e.g., "CONFIGURATION" is displayed, provides the user with access to a number of ration Menu Items such as shown in FIG. 7.

External Alarm Menu Item

When the External Alarm Menu Item is running, the display part 115 shows a message such as, e.g., "EXT. ALARM—OFF" if the external alarm is then disabled, or "EXT. ALARM—ON" if the outside alarm is currently enabled. The plus and minus buttons 126, 128 may then be operated to toggle between the ON and OFF external alarm states, and the enter button 124 then operated to select and store the selected state. If an optional outside siren or alarm is installed, the optionally bound External Siren output of the system 10 (see FIG. 5) is set to be driven by the processor 100 whenever an alarm signal is received from one of the system sensors/detectors.

Main Display Menu Item

This Item allows the user to toggle between a "MAIN DISPLAY—OFF" and a "MAIN DISPLAY—ON" display, and to select and store the desired state (via the Enter button 124). When the MAIN DISPLAY—ON state is selected, the display part 115 will show time, date, and current ambient temperature as in FIG. 6. When OFF, the display part 115 may be set blank.

Phone Dialer Menu Item

When running, this Menu Item is configured to display, e.g., "PHONE DIALER—OFF" if the optional voice/data unit 50 is absent or otherwise disabled. The display part 115 will show "PHONE DIALER—ON" if the voice/data unit 50 is currently installed and enabled. The user may then toggle (via the Plus and Minus buttons 126, 128) between an ON and an OFF state for the unit 50. Depressing the Enter button 124 operates to signal the processor 100 to implement the displayed state. When installed, the phone dialer feature enables the system 10 to initiate calls to a defined list of telephone numbers in a desired order, as well as to receive incoming data and commands.

I/O Enable Menu Item

While the I/O Enable Menu Item is running, the display part 115 shows, e.g., "INPUT/OUTPUT DEVICES". Operating the Enter button 124 during this display allows the user either to enable or to disable individual input and output connection blocks (see FIG. 5). A text interface may be provided on the display part 115 that cycles through supported blocks, and allows each of them to be turned on or off. Certain fields may be programmed to allow them to be modified by the user. Such fields may blink when displayed to indicate that they may be so changed.

Field Upgrade Menu Item

Activation of the Field Upgrade Menu Item causes the display part 115 to show, e.g., "FIELD UPGRADE". Operating the Enter button 124 during this display allows access to a field upgrade routine. The user or system installer is prompted to select either a local or a remote upgrade via the display part 115. Local upgrades are defined as those which allow the system 10 to be changed when the voice/data unit 50 is absent. Remote upgrades are defined as those which are possible using the unit 50, and allow the system 10 to be updated from a remote location over a telephone line.

For remote upgrades, the processor 100 is configured to cause the voice/data 50 to dial a telephone number programmed into a "phone book" location, e.g., in the PROM 102, and to connect with a field upgrade host while providing an interface to the user. Access to such a field upgrade service may be protected for licensed installers by use of a "password". Thus, the Field Upgrade Menu Item allows an installer or other qualified person to upgrade the system 10 without having to "swap" main board parts, or otherwise removing the system 10 from active service.

Water Heater Type Menu Item

When running, the Water Heater Type Menu Item causes the display part 115 to show, e.g., "GAS WATER HEAT". The user may then toggle (via the plus and minus buttons 126, 128) to select between, e.g., "ELECTRIC" and "OTHER". Operating the enter button 124 then signals the processor 100 to integrate the selected type of water heater. This information is needed by the system processor to determine if a utility service supply line to the water heater needs to be disabled in the event of, e.g., a carbon monoxide alarm signal from a CO detector in the environment. For example, if an electric water heater is selected and a CO alarm condition is sensed, the electric supply line to the water heater will not be disabled since an electric water heater will not generate carbon monoxide in the event of a malfunction. If the water heater is gas or oil-fired ("other"), however, the presence of CO will cause the associated water heater supply switch to open thus extinguishing the flame inside the heater.

The next menu heading shown in FIG. 7 is a Phone Book Menu Heading. This menu heading may be activated if the voice/data unit 50 is installed. Operating the Enter button 124 when the "PHONE BOOK" heading is displayed allows the user to obtain the following Menu Items.

View Phone Book Menu Item

When run, this menu item initiates a display of, e.g., "VIEW PHONE BOOK". Operating the Enter button 124 allows the user to view phone numbers currently in a phone book storage area of the PROM 102 or other memory area, and the state of the numbers. Each stored number may have an associated state that allows it to be selected as part of a dialing plan during an alarm condition.

The dialing plan may be defined as a list of telephone numbers to be dialed by the voice/data unit 50, in a determined order, when a sensed hazardous condition exists. For example, operating the Enter button can cause a display such as "1) XXXXXXXXXX ON", where "XXXXXXXXXX" is a phone number and "ON" (or "OFF") is its associated state. The user may then use the plus and minus buttons 126, 128, to scroll through the list of telephone numbers.

Phone Book Insert/Modify Menu Item

When invoked, the Phone Book Insert/Modify Menu Item causes the processor 100 to show a message such as, e.g., "EDIT PHONE BOOK" on the display part 115. Operating the Enter button 124 during this display allows the user to insert, modify or delete phone book entries. If no phone book entries exist, a display such as "1) EMPTY OFF" may be provided. The displayed field may be modified to insert a numeric phone book entry as desired via the Left/Right buttons 130, 132, and the Plus/Minus buttons 126, 128. The Enter button 124 is then operated to save any modified fields. A phone book entry may be deleted by operating the delete button 136 when that entry is displayed.

The menu system may also include a Test menu heading. Operating the Enter button 124 when the word "TEST" is displayed will then provide the user with access to the following Test Menu Items.

Test Inputs Menu Item

When activated, the Test Inputs Menu Item initiates a display of, e.g., "TEST SYSTEM INPUTS". Operating the Enter button 124 during this display allows the user to test each of the system inputs. The user may then use the Plus and Minus buttons 126, 128 to select an input for test among all available inputs at the system buffers 106, 108, in FIG. 2. When a desired input is displayed, the user may operate the Enter button 124 to initiate the test, and the display part 115 is then updated to show the state of the input under test.

This routine therefore allows the user to verify that the system 10 is properly detecting both the "on" and the "off" states of all system inputs. During the test state, the processor 100 does not cause any change in the current status of the output drivers $110_1$ to $110_n$, due to changes at the input buffer stages $106_1$–$106_m$ and 108, resulting from the test routine.

Test Outputs Menu Item

This menu item initiates a display such as, e.g., "TEST SYSTEM OUTPUTS". Operating the Enter button 124 during this display allows the user to test each of the output drivers $110_1$ to $110_n$, in FIG. 2. The Plus and Minus buttons 126, 128, are used to select a given output driver from among all of the drivers for testing.

When a desired output driver is identified, the user operates the Enter button 124 to initiate the test, and the processor 100 signals the selected output driver to an alarm condition state. The user may then verify by inspection that the system 10 is properly controlling the corresponding output device. To end the test, the user operates the Cancel button 138.

Self Test Menu Item

When implemented, the Self-Test Menu Item causes the display of, e.g., "SELF TEST". Operating the Enter button 124 during the display allows the user to invoke the system self-test, which is the same self-test explained above in connection with the Self Test button 140.

Phone Test Menu Item

When this Item is running, a message such as "TEST PHONE DIALER" is displayed. Operating the Enter button 124 during the display allows the user to test the voice/data unit 50 functionally. The user may use the Plus and Minus buttons 126, 128, to select a telephone number among the numbers stored in the system 10, and to initiate a test call. When the desired number is displayed, the Enter button 124 is operated and the selected number is dialed by the modem unit 50. Operation of the Cancel button 138 ends this test routine.

Battery Test Menu Item

Invoking this Item causes the display part 115 to show, e.g., "TEST BATTERY". Operation of the Enter button 124 during the display allows the user to test the system battery 40 in FIG. 2. The display is updated to show the state of the battery 40. Operation of the Cancel button 138 ends the test.

The next Menu Heading in FIG. 7 is the Time Functions Menu Heading. Operating the Enter button 124 when a term such as, e.g., "CLOCK" is displayed provides the user with access to the following Time Functions Menu Items.

Set Time and Date Menu Item

This menu item initiates a display such as, e.g., "SET TIME AND DATE". Operating the Enter button 124 allows the display part 115 to be updated with "HH.MM—DD.MM.YY" (where HH.MM is current time in 24-hour format, and DD.MM.YY is current date in day/month/year format). The Left and Right buttons 130, 132, allow the user to move left and right through the time and date fields. The Plus and Minus buttons 126, 128, allow a currently selected field to be modified. As mentioned, the selected field may blink to show that it is modifiable by the user.

Operating the Enter button 124 when a desired date and time is displayed will cause the current system date and time to be updated. The current time is maintained by the system 10 while in this Menu Item, until a modified date and time are so updated by the user.

Maintenance Reminder Menu Item

When run, this Menu Item initiates a display of, e.g., "REMINDERS". The user may then program the processor 100 and associated memory areas to initiate a display of reminders concerning maintenance of the system 10. Such activities may include, for example, periodic system tests, sensor/detector maintenance schedules, and control device maintenance schedules.

An Alarm History Menu Heading may also be provided, as in FIG. 7, to allow the user to obtain the following Menu Items.

View Alarm History Menu Item

When run, this Menu Item causes a display of a message such as, e.g., "VIEW ALARM HISTORY". Operating the Enter button 124 during the display allows the user to view an alarm history for the system 10. The history may contain a detailed description of each hazardous condition sensed by the system 10, beginning at a time when the alarm history was last cleared, up to a maximum of, e.g., 32 different events. The description may include information such as the date and time each event was triggered, the duration of the condition, a name or identification of the sensor or detector that triggered the system 10, and a list of telephone numbers that were successfully called by the voice/data unit 50.

When the Enter button 124 is operated, the display part 115 may indicate "WATER HH.MM. DD.MM.YY". The Left and Right buttons 130, 132, may be used to toggle between various parts of the display field. Any other information deemed appropriate to include in the alarm history may be made accessible in this manner. The Plus and Minus buttons 126, 128, may be used to scroll through a list of alarms. Once the alarm history becomes full, the processor 100 may periodically inform the user of such condition by updating the display part 115 and sounding the internal chime.

Clear Alarm History Menu Item

This Menu Item causes a display of, e.g., "CLEAR ALARM HISTORY". Operating the Enter button 124 during the display allows the user to clear the system alarm history after an initial warning message such as, e.g., "ARE YOU SURE—Y". The user may then toggle between a "Y" and a "N" answer field, and then operate the Enter button 124 to commit the desired action.

In addition to the above system Menu Headings and configurable Menu Items, the system 10 may incorporate an internal diagnostic function and report any errors detected by such function to the user. The scope of such diagnostic routines can be defined during a detailed software implementation phase for the system 10, in a known manner.

The following provides further descriptions of various input sensors and detectors that may be used with the system 10, to detect or signal the presence of a hazardous condition.

Water Sensors

Water sensors such as the one shown in FIG. 1 are constructed and arranged to detect the presence or absence of water, and to produce a corresponding alarm signal. The typical system configuration of FIGS. 3 and 5 supports, e.g., three different water sensor inputs. Each input may be coupled to a set of one or more physical water sensors such as, for example, water sensors sold under the name "WaterBug", Model WB-200, surface sensor part No. 1040, from Winkand Electronics, Inc. in Mankato, Minn.

Water sensors that can be configured or wired to detect either the presence or absence of water, will allow the system 10 to detect either condition and to take corrective actions in addition to those detailed herein. Only sensors that meet all applicable federal and local laws and standards for the environment in which the system 10 is installed, should be employed.

Water Pump Sensors

One or more water pump sensors operate to detect standing water above a certain level in a basement sump, and thus act as a sump pump failure warning device. A typical system configuration such as in FIG. 5 supports one water pump sensor input. A water pump sensor known as "Cellar Saver", Model CS-29 available from Cellar Saver, Buffalo, N.Y. may be used with the system 10. Other water pump sensors meeting the required standards may also be used.

Temperature Sensor

Temperature sensors such as the one shown in FIG. 1 operate to detect over-temperature and under-temperature threshold conditions. A suitable switch type of room temperature sensor is, e.g., type RS-0 or RTS-C available from Potter Electric Signal Co., St. Louis, Mo. The Temperature input in the configuration of FIG. 3 assumes that the associated temperature sensor is set to produce an alarm signal when the sensed temperature is above or below a desired threshold level. Alternatively, the system 10 may be configured to set such a threshold temperature level for temperature sensors whose outputs vary in accordance with the temperature they sense. For example, a "Set Temperature Threshold" Menu Item may be included under the configuration Menu Heading in FIG. 7, to allow temperature threshold values to be set for one or more temperature level sensors connected with the system 10.

Smoke Sensor

Smoke sensors provide a means for detecting the presence of ambient smoke. A commercially available smoke detector meeting all applicable standards may be connected to the smoke detector input in the configuration of FIG. 3.

Carbon Monoxide Sensor

Carbon monoxide sensors such as the one shown in FIG. 1, operate to measure the concentration of CO gas in an enclosed area. Commercially available CO sensors may be used in connection with the system 10.

Discrete Sensors

A discrete sensor operates to sense a condition that will modify a programmed input-output configuration for the system 10. The Water Alarm Override input in FIG. 3 is an example of the application of this type of sensor. See FIG. 5 in which Water Valves 1, 2 and 3 are not closed in response to inputs from the Water Sensors 1, 2 and 3, when the Water Alarm Override input to the system is active.

One or more control devices such as water and fuel valves, and electrical relays or switches in FIG. 1, are driven selectively in the system 10 in response to alarm signals from one or more of the system sensors/detectors. The devices are now described in further detail.

Valves

The standard configuration in FIG. 3 supports three outputs for controlled Water Valves 1–3. The valves provide the system 10 with the ability to shut off water flow, either at a main water supply line inlet, or at water feed inlets of certain appliances. Typically, the valves are normally open and are driven closed by one or more of the output drivers $110_1$ to $110_n$, upon detection of certain alarm signals, according, for example, to the connection block of FIG. 5. Typical water control valves include, for example, the S21 and S212 series of solenoid valves from GC Valves, Simmi Valley, Calif.

Sirens/Alarms

The system 10 has the ability to generate continuous audible alarms, serving to alert persons near the monitored environment of a sensed hazardous condition. One siren may be resident on a main system control board. An optional, external siren may be placed at a remote location to augment the first siren.

Relays

The typical configuration of FIG. 3 supports two controlled Boiler Relays 1 and 2, and one Auxiliary Relay. These relays may be incorporated in the control unit 26 itself, or externally. The relays provide the system 10 with the ability to interrupt the electrical supply line 32 with respect to a given appliance. Typically, the relays are normally closed are driven by selected output drivers $110_1$ to $110_n$ to an open state upon detection of certain alarm signals. See FIG. 5.

Water Heating Supply Switch

The typical configuration of FIG. 3 includes an output driver for a Water Heating Supply Switch. This switch may be included with the system 10, internally or externally of the control unit 26, for turning off a water heater of the type "OTHER" upon detection of certain alarm signals. As mentioned, the water heater is defined when running the Water Heater Type Menu Item in FIG. 7.

While the foregoing description represents preferred embodiments of the invention, it will be obvious to those skilled in the art that various changes and modifications may be made, without department from the true spirit and scope of the invention pointed out by the following claims.

We claim:

1. An appliance monitor and control system, comprising:
   one or more system sensors each of which is arranged to detect a hazardous condition and to produce a corresponding alarm signal in an environment including a water service supply line, a fuel service supply line, and an electric service supply line, and one or more appliances including a combustion fueled water heater or boiler having a water feed inlet for communication with the water service supply line and a fuel inlet for communication with the fuel service supply line, wherein the fuel inlet is operative to close in the absence of an associated electrical connection;
   a number of control devices wherein each control device is constructed and arranged operatively to disconnect a corresponding service supply line from one or more of the appliances to which the supply line is connected, in response to a corresponding drive signal;
   a processor/driver having one or more inputs coupled to the system sensors and one or more outputs coupled to the control devices, wherein the processor/driver is configured so that a given control device is driven in response to an alarm signal originating from a corresponding one or more of the system sensors;
   one of the system sensors is a first water sensor constructed and arranged for location in the vicinity of the water heater or boiler; and
   the control devices include at least,
   (i) a switch mechanism constructed and arranged for connection to a part of the fueled water heater or boiler, wherein the switch mechanism is configured to remove the electrical connection associated with the fuel inlet of the water heater or boiler in response to a water alarm drive signal that is produced by the processor/driver in response to the alarm signal from the first water sensor, thus closing the fuel inlet to the water heater or boiler, and (ii) a first water control valve constructed and arranged for connection to the water feed inlet of the water heater or boiler, wherein the first water control valve is configured to shut off a supply of water from the water service supply line to the water heater or boiler in response to the water alarm drive signal from the processor/driver.

2. A system according to claim 1, wherein the switch mechanism comprises a relay.

3. A system according to claim 1, wherein one of the system sensors is a carbon monoxide (CO) sensor constructed and arranged for location in the vicinity of the fueled water heater or boiler, the processor/driver is configured to produce a CO drive signal in response to the alarm signal produced by the CO sensor, and said switch mechanism is configured to respond to the CO alarm drive signal from the processor/driver.

4. A system according to claim 1, wherein one of the system sensors is a smoke sensor constructed and arranged for location in the vicinity of the fueled water heater or boiler, the processor/driver is configured to produce a smoke drive signal in response to the alarm signal produced by the first smoke sensor, and said switch mechanism is configured to respond to the smoke alarm drive signal from the processor/driver.

5. A system according to claim 1, wherein said system sensors include one or more temperature sensors.

6. A system according to claim 1, wherein said system sensors include one or more water pump sensors.

7. A system according to claim 1, including a voice/data unit arranged to be coupled to the processor/driver, wherein the voice/data unit is constructed and arranged to communicate information concerning operation of the system to one or more designated telephone numbers.

8. A system according to claim 7, wherein the voice/data unit is in the form of a separate part that is constructed and arranged to be connected with the system.

9. A system according to claim 1, including a main control unit comprising a display/keypad arrangement coupled to the processor/driver, and the display/keypad arrangement is constructed and arranged to provide a user interface with the system.

10. A system according to claim 9, wherein the main control unit includes the switch mechanism to be connected to part of the water heater or boiler.

11. A system according to claim 1, including one or more second water control valves, and the processor/driver is configured to inhibit drive signals to those second water control valves which would otherwise act to shut off the water service supply line from a fire sprinkler in the environment, in response to a water alarm override input to the processor/driver.

12. An appliance monitor and control system, comprising:
one or more system sensors each of which is arranged to detect a hazardous condition and to produce a corresponding alarm signal in an environment including a water service supply, a fuel service supply line and an electric service supply line, and one or more appliances including a water heater or boiler that is either combustion fueled or electrically powered;

a number of control devices wherein each control device is constructed and arranged operatively to disconnect a corresponding service supply line from one or more of the appliances to which the supply line is connected, in response to a corresponding drive signal;

a processor/driver having one or more inputs coupled to the system sensors and one or more outputs coupled to the control devices, wherein the processor/driver is configured so that a given control device is driven in response to an alarm signal originating from a corresponding one or more of the system sensors;

the processor/driver is configured to operate in a selected one of a first mode wherein the water heater or boiler is designated as a combustion fueled water heater, or a second mode wherein the water heater is designated as an electrically powered water heater;

one of the control devices is a switch mechanism constructed and arranged for connection to a part of the fueled water heater or boiler, wherein the switch mechanism is configured to remove an electrical connection associated with a fuel inlet of the fueled water heater or boiler in response to a heating supply switch drive signal that s produced by the processor/driver in response to a water alarm signal from a first water sensor in the vicinity of the fueled water heater or boiler, when the processor/driver is in the first mode; and the processor/driver is configured to inhibit said heating supply switch drive signal when the processor/driver is in the second mode.

13. A system according to claim 12, wherein the switch mechanism comprises a relay.

14. A system according to claim 12, wherein one of the system sensors is a carbon monoxide (CO) sensor constructed and arranged for location in the vicinity of the water heater or boiler, the processor/driver is configured to produce a CO alarm drive signal in response to the alarm signal produced by the CO sensor, and said switch mechanism is configured to respond to the CO alarm drive signal when the processor/driver is in the first mode.

15. A system according to claim 12, wherein one of the system sensors is a smoke sensor constructed and arranged for location in the vicinity of the water heater or boiler, the processor/driver is configured to produce a smoke alarm drive signal in response to the alarm signal produced by the smoke sensor, and said switch mechanism is configured to respond to the smoke alarm drive signal when the processor/driver is in the first mode.

16. A system according to claim 12, including a voice/data unit arranged to be coupled to the processor/driver, wherein the voice/data unit is constructed and arranged to communicate information concerning operation of the system to one or more designated telephone numbers.

17. A system according to claim 16, wherein the voice/data unit is in the form of a separate part that is constructed and arranged to be connected with the system.

18. A system according to claim 12, including a main control unit comprising a display/keypad arrangement coupled to the processor/driver, and the display/keypad arrangement is constructed and arranged to provide a user interface with the system.

19. A system according to claim 18, wherein the main control unit includes the switch mechanism to be connected to part of the fueled water heater or boiler.

20. A system according to claim 12, including one or more water control valves, and the processor/driver is configured to inhibit drive signals to those water control valves which would otherwise act to shut off the water service supply line from a fire sprinkler in the environment, in response to a water alarm override input to the processor/driver.

* * * * *